(12) United States Patent
Peirsman et al.

(10) Patent No.: US 10,968,337 B2
(45) Date of Patent: Apr. 6, 2021

(54) OXYGEN-SCAVENGING POLYMER COMPOSITIONS

(71) Applicant: Anheuser-Busch InBev S.A., Brussels (BE)

(72) Inventors: Daniel Peirsman, Leuven (BE); Vanessa Valles, Leuven (BE)

(73) Assignee: Anheuser—Busch Tnbev S.A., Brussels (BE)

( * ) Notice: Subject to any disclaimer, the term of this patent is extended or adjusted under 35 U.S.C. 154(b) by 0 days.

(21) Appl. No.: 15/576,843

(22) PCT Filed: May 26, 2016

(86) PCT No.: PCT/IB2016/053080
§ 371 (c)(1),
(2) Date: Nov. 26, 2017

(87) PCT Pub. No.: WO2016/189483
PCT Pub. Date: Dec. 1, 2016

(65) Prior Publication Data
US 2018/0163038 A1    Jun. 14, 2018

Related U.S. Application Data

(60) Provisional application No. 62/167,105, filed on May 27, 2015.

(51) Int. Cl.
*C08L 23/22* (2006.01)
*B01J 20/26* (2006.01)
(Continued)

(52) U.S. Cl.
CPC ............... *C08L 23/22* (2013.01); *A23L 2/42* (2013.01); *A23L 2/54* (2013.01); *A23L 3/3436* (2013.01);
(Continued)

(58) Field of Classification Search
None
See application file for complete search history.

(56) References Cited

U.S. PATENT DOCUMENTS 4,536,409 A * 8/1985 Farrell .................. A23L 3/3436
426/398
4,702,966 A   10/1987 Farrell et al.
(Continued)

FOREIGN PATENT DOCUMENTS

CN    102076758    5/2011
EP    0 180 442    5/1986
(Continued)

*Primary Examiner* — Satya B Sastri
(74) *Attorney, Agent, or Firm* — Levy & Gradinetti

(57) ABSTRACT

The present invention describes polymer compositions that have enhanced properties as oxygen barriers, as well as manufacturing methods for such oxygen-scavenging polymers and devices composed of such oxygen-scavenging polymers. These oxygen-scavenging polymers offer several benefits over existing materials, including a reduced ability for oxygen and carbon dioxide to permeate the polymer, reduced foaming of beverages stored in containers composed of the polymers, improved moisture absorption, and increased anti-bacterial/anti-fungal properties.

8 Claims, 5 Drawing Sheets

(51) Int. Cl.

| | | |
|---|---|---|
| *B01J 20/22* | (2006.01) | |
| *B01J 20/04* | (2006.01) | |
| *B01J 20/10* | (2006.01) | |
| *B65D 81/26* | (2006.01) | |
| *B65D 51/24* | (2006.01) | |
| *A23L 2/54* | (2006.01) | |
| *A23L 3/3436* | (2006.01) | |
| *A23L 2/42* | (2006.01) | |
| *C12C 11/11* | (2019.01) | |
| *C08K 3/30* | (2006.01) | |
| *C08L 23/08* | (2006.01) | |
| *C08L 23/00* | (2006.01) | |
| *C08K 3/34* | (2006.01) | |
| *C08L 9/06* | (2006.01) | |
| *C08L 23/06* | (2006.01) | |
| *C08L 23/12* | (2006.01) | |
| *C12H 1/14* | (2006.01) | |
| *C08K 5/1535* | (2006.01) | |
| *C08L 23/16* | (2006.01) | |
| *C08L 29/04* | (2006.01) | |
| *C08L 33/24* | (2006.01) | |

(52) U.S. Cl.
CPC ............ *B01J 20/045* (2013.01); *B01J 20/10* (2013.01); *B01J 20/22* (2013.01); *B01J 20/265* (2013.01); *B65D 51/244* (2013.01); *B65D 81/266* (2013.01); *C08K 3/30* (2013.01); *C08K 3/34* (2013.01); *C08K 5/1535* (2013.01); *C08L 9/06* (2013.01); *C08L 23/00* (2013.01); *C08L 23/06* (2013.01); *C08L 23/0846* (2013.01); *C08L 23/12* (2013.01); *C08L 23/16* (2013.01); *C08L 29/04* (2013.01); *C08L 33/24* (2013.01); *C12C 11/11* (2013.01); *C12H 1/14* (2013.01); *A23V 2002/00* (2013.01); *C08K 2201/012* (2013.01); *Y02C 20/40* (2020.08)

(56) References Cited

U.S. PATENT DOCUMENTS

| | | | |
|---|---|---|---|
| 5,106,886 A | 4/1992 | Hofeldt et al. | |
| 5,389,709 A * | 2/1995 | Itamura | C08K 3/013 524/239 |
| 6,210,601 B1 | 4/2001 | Hottle et al. | |
| 6,228,284 B1 * | 5/2001 | Ebner | A23L 3/3436 206/524.1 |
| 6,911,171 B2 * | 6/2005 | Lauer | B32B 1/08 264/248 |
| 8,889,201 B2 | 11/2014 | Tatera | |
| 9,663,643 B2 * | 5/2017 | Coulter | C08L 23/10 |
| 2003/0212167 A1 | 11/2003 | Weng et al. | |
| 2006/0102875 A1 * | 5/2006 | Ekkert | C01B 13/0281 252/188.28 |
| 2011/0040012 A1 * | 2/2011 | Chai | C08L 23/06 524/430 |
| 2012/0289643 A1 * | 11/2012 | Kanda | C08G 69/265 524/451 |
| 2013/0285277 A1 | 10/2013 | Behrendt et al. | |
| 2014/0311099 A1 | 10/2014 | Uradnisheck | |
| 2015/0118366 A1 * | 4/2015 | Bonnel | B65D 41/02 426/106 |

FOREIGN PATENT DOCUMENTS

| | | | |
|---|---|---|---|
| EP | 2 851 391 | | 3/2015 |
| JP | 2003-192847 | | 7/2003 |
| JP | 2003192847 A | * | 7/2003 |
| RU | 2 495 063 | | 10/2013 |
| RU | 2 639 289 | | 12/2017 |
| WO | WO-0114219 A1 | * | 3/2001 ............ B65D 41/62 |
| WO | WO 2015/040232 | | 3/2015 |

* cited by examiner

OXYGEN-SCAVENGING POLYMER COMPOSITIONS

TECHNICAL FIELD

The present invention pertains to oxygen-scavenging polymers, as well as to methods for manufacturing and using such polymers and apparatuses and containers composed of such polymers. More particularly, the present invention is directed to: a) oxygen-scavenging polymers comprising both a hydrophobic polymer and an oxygen scavenger; b) methods of manufacturing oxygen-scavenging polymers, by dispersing particles of an oxygen scavenger throughout a matrix of hydrophobic polymer; and c) apparatuses containing oxygen-scavenging polymers, wherein the oxygen-scavenging polymers comprise a combination of a hydrophobic polymer and an oxygen scavenger. The oxygen scavenging polymer may also comprise a hydrophilic polymer component.

BACKGROUND OF THE INVENTION

When packaging and storing foods and beverages, several factors must be taken into account to ensure that the flavors and other properties of those beverages and foodstuffs are preserved. One major concern to those in the art of food and beverage preservation is oxidation: the chemical reactions that occur between oxygen and the molecules of the various compounds within the food or beverage. For example, when beer comes into contact with oxygen, molecules such as fusel alcohols, acetaldehyde, and trans-2-nonenal may be created by oxidation reactions, causing the beer to taste stale and improperly flavored (those tasting such a beer may describe it as having stale "cardboard" or "paper" flavors). Such effects are especially pronounced in lighter-bodied, less alcoholic beers, which have a delicate balance of flavors that can quickly be upset by oxidation.

To deal with the issues caused by oxidation, those in the art have developed methods and materials for storing beer (and other foods and beverages) that aim to prevent oxygen from reacting with the beer and disrupting its flavors and tastes, and to reduce oxygen levels to prevent the growth of microorganisms. However, these existing ways of preserving beer (and other foods and beverages) suffer from various drawbacks.

For example, some in the art of food/beverage preservation have developed "oxygen-scavenging" materials that react with oxygen, consuming the oxygen in a storage container to reduce oxygen levels in that container in order to prevent that oxygen from reacting with food stored in the container. However, oxygen-scavenging materials that react immediately with oxygen under any conditions must be used immediately to both construct a container and to store food/beverage in that container—if not, the oxygen-scavenging capability of such materials will be used up while the oxygen-scavenging material is stored in a warehouse or other storage facility, awaiting use. As such, these materials have been found to be unsuitable for use in most food/beverage storage applications for logistical reasons.

With this challenge in mind, to ensure that the oxygen-scavenging capability of a container material is not used up and exhausted before a food or beverage is even stored in that container, those in the art have attempted to develop materials that do not scavenge oxygen until "triggered" by some condition—for example, humidity. Those in the art have experimented with various polyesters, which have oxygen-scavenging properties triggered by humidity, and which are not permeable to gas.

However, these polyester materials suffer from yet another issue, as it takes too long for their oxygen-scavenging capabilities to be triggered by humidity, in some cases several hours. And for certain foods/beverages, a few hours is too long—by that time, the oxidation reactions have already done their damage, negatively altering the flavors that were stored within that container.

In an attempt to develop a container material that does not exhaust its oxygen-scavenging capability until a food and/or beverage is stored within a container made out of that material, but that also does not excessively delay until it begins to scavenge oxygen, some have experimented with cobalt-impregnated polymers to store food or drink. Unfortunately, however, cobalt is toxic at elevated levels, and polymers containing sufficient amounts of cobalt for effective oxygen-scavenging cannot be legally used to store food/drink because of the toxic effects of the cobalt within.

Accordingly, there remains a need for a safe, non-toxic oxygen-scavenging material that can be effectively used to prevent the oxidation of foods or beverages stored in a container that comprises that oxygen-scavenging material.

SUMMARY OF THE INVENTION

The present invention is directed, in certain embodiments, to oxygen-scavenging polymers, the oxygen-scavenging polymers comprising a hydrophobic polymer and an oxygen scavenger.

In certain embodiments of the invention, the oxygen-scavenging polymer further comprises a hydrophilic polymer. In certain further embodiments of the invention, the hydrophilic polymer and particles of the oxygen scavenger are each dispersed throughout a matrix of the hydrophobic polymer.

In certain embodiments of the invention, the hydrophilic polymer is selected from the group consisting of ethylene vinyl alcohol (EVOH), polyvinyl alcohol (PVOH), and polyesters such as polyamide.

In certain embodiments of the invention, the oxygen-scavenging polymer comprises between about between about 5% and 20% oxygen scavenger and between about 1% and about 6% hydrophilic polymer. In certain further embodiments of the invention, the oxygen-scavenging polymer comprises between 10% and about 15% oxygen scavenger, and between about 2% and about 5% hydrophilic polymer. In still further embodiments of the invention, the oxygen-scavenging polymer comprises about 12% oxygen scavenger, and about 3% hydrophilic polymer. In certain other further embodiments of the invention, the oxygen-scavenging polymer comprises about 12% oxygen scavenger, and about 4% hydrophilic polymer.

In certain embodiments of the invention, particles of the oxygen scavenger are dispersed throughout a matrix of the hydrophobic polymer.

In certain embodiments of the invention, the oxygen-scavenging polymer comprises talc.

In certain embodiments of the invention, the oxygen scavenger is a water-activated oxygen scavenger. In certain further embodiments of the invention, the water-activated oxygen scavenger is selected from the group consisting of sodium sulphite, sodium ascorbate, potassium sulphite, and potassium ascorbate.

In certain embodiments of the invention, the hydrophobic polymer is selected from the group consisting of: polyolefins such as polyethylene or polypropylene; polyesters such as polyamide or polyethylene terephthalate (PET); thermoplastic elastomers such as thermoplastic vulcanizate styrene isoprene butadiene, polymethylpentene, polybutene-1, polyisobutylene, ethylene propylene rubber, and ethylene propylene diene monomer rubber; and blends of two or more such hydrophobic polymers. In certain further embodiments of the invention, the hydrophobic polymer is a thermoplastic vulcanizate.

In certain embodiments of the invention, the oxygen-scavenging polymer comprises between about between about 5% and 20% oxygen scavenger. In certain further embodiments of the invention, the oxygen-scavenging polymer comprises between about 10% and about 15% oxygen scavenger. In still further embodiments of the invention, the oxygen-scavenging polymer comprises about 12% oxygen scavenger.

The present invention is directed, in certain embodiments, to methods of manufacturing oxygen-scavenging polymers, those methods comprising the step of dispersing particles of an oxygen scavenger throughout a matrix of a hydrophobic polymer. In certain embodiments of the invention, the methods further comprise the step of dispersing a hydrophilic polymer throughout the matrix of the hydrophobic polymer.

In certain embodiments of the invention, the methods further comprise the step of dispersing talc throughout the matrix of the hydrophobic polymer.

The present invention is directed, in certain embodiments, to apparatuses containing an oxygen scavenging polymer, the oxygen-scavenging polymer comprising a hydrophobic polymer and an oxygen scavenger.

In certain embodiments of the invention, the oxygen-scavenging polymer comprises talc.

In certain embodiments of the invention, the apparatus is a closure for a beverage container, the closure comprising a shell and sealing elements. In certain further embodiments of the invention, the shell is comprised of the hydrophobic polymer, the sealing elements are comprised of a thermoplastic elastomer, and the oxygen scavenger is dispersed within the shell and/or the sealing elements.

In certain embodiments of the invention, the hydrophobic polymer is a polyolefin such as polyethylene or polypropylene.

In certain embodiments of the invention, the apparatus is an apparatus selected from the group consisting of closures, liquid lines, packaging for liquids, and liquid reservoirs.

The present invention is directed, in certain embodiments, to a container comprising: a) at least one wall, the at least one wall comprising an oxygen-scavenging polymer that comprises a hydrophobic polymer and an oxygen scavenger, and b) at least one beverage or beverage component.

In certain embodiments of the invention, a capacity of the container is between about 0.01 liters and about 20 liters.

In certain embodiments of the invention, the container further comprises ethanol and water.

In certain embodiments of the invention, the at least one beverage or beverage component is selected from the group consisting of a beverage, a beverage concentrate, a beverage component, and a concentrated beverage component. In certain further embodiments of the invention, a volume of the beverage concentrate comprises between about 2 times and about 6 times the sugar content and alcohol content of an equal volume of a beverage from which the beverage concentrate is derived. In certain further embodiments of the invention, a volume of the beverage concentrate comprises between about 2.5 and about 3.5 times the sugar content and alcohol content of an equal volume of a beverage from which the beverage concentrate is derived.

In certain embodiments of the invention, the container is a sealed container. In certain further embodiments of the invention, the sealed container further comprises a gas.

The present invention is directed, in certain embodiments, to methods of preparing a beverage comprising the steps of providing an apparatus containing an oxygen-scavenging polymer, the oxygen-scavenging polymer comprising a hydrophilic polymer and an oxygen scavenger, and the apparatus comprising a first container with at least one wall and at least one beverage component, and diluting the beverage component with a liquid to prepare a beverage.

In certain embodiments of the invention, the liquid comprises a water, a carbonated water, or a beer.

In certain embodiments of the invention, the at least one beverage component is selected from the group consisting of a beverage, a beverage concentrate, a beverage component, and a concentrated beverage component. In certain further embodiments of the invention, the beverage concentrate is a brewed concentrate. In still further embodiments of the invention, the brewed concentrate is a beer concentrate.

In certain embodiments of the invention, the methods further comprise the step of carbonating the beverage.

In certain embodiments of the invention, the methods further comprise the step of dispensing the beverage into a second container.

In certain embodiments of the invention, the oxygen scavenger is selected from the group consisting of sodium sulphite, sodium ascorbate, potassium sulphite, and potassium ascorbate.

DETAILED DESCRIPTION OF THE INVENTION

As discussed above, the present invention is directed to oxygen-scavenging polymers that comprise both a hydrophobic polymer and an oxygen scavenger. As those of ordinary skill in the art will recognize, such oxygen-scavenging polymers reduce oxygen levels in an apparatus or container, helping to protect substances such as foods and beverages from the damage, alteration, and other effects caused by oxidation reactions.

Figure 1:
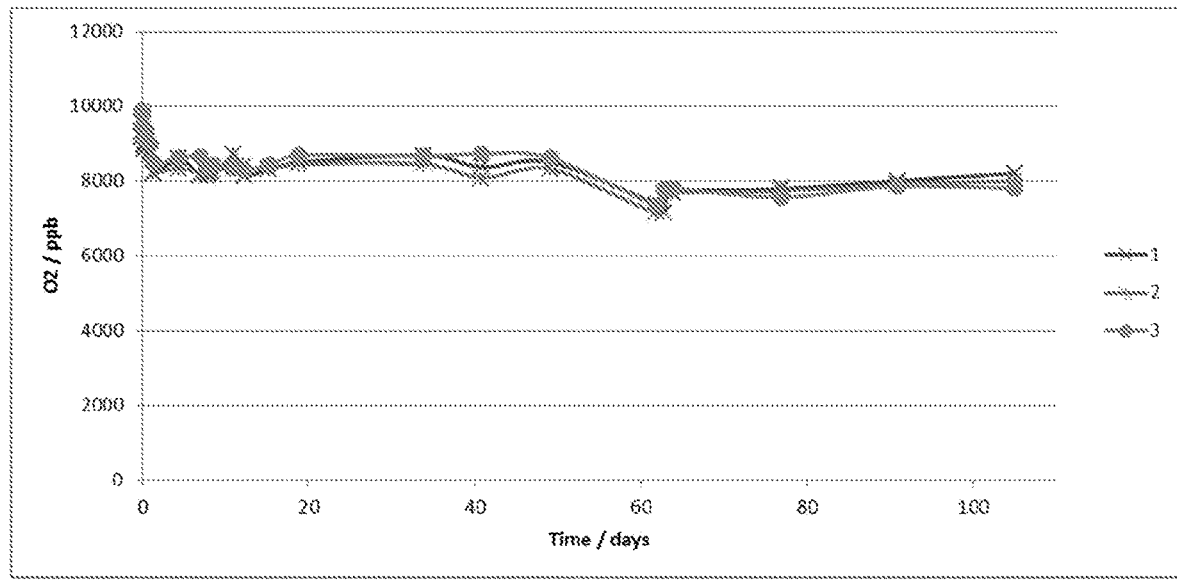
FIG. 1 is a graph depicting oxygen levels over time in a container that holds oxygen-saturated water.

A depiction of oxygen levels over time in a sealed glass flask filled with oxygen-saturated water, and without any oxygen-scavenging material in the flask, is presented in the graph of FIG. 1. As depicted in FIG. 1, and as recognized by those of skill in the art, without an oxygen scavenger present, the oxygen levels in the flask remain relatively constant over time. These constant oxygen levels, in the presence of food or beverage, result in oxidation reactions in the container, as well as the growth of microorganisms such as fungi or bacteria.

Figure 2:
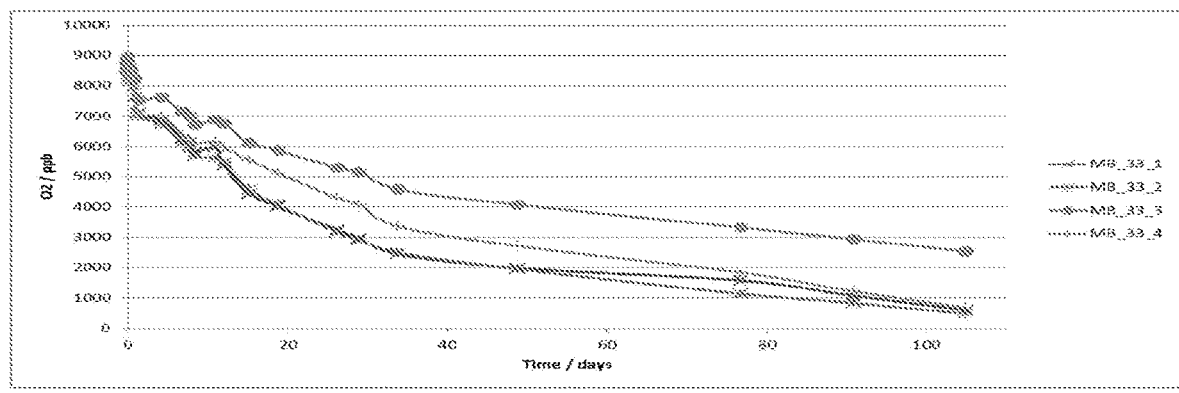
FIG. 2 is a graph depicting oxygen levels over time in a container that holds both oxygen-saturated water and a base resin material comprising a first thermoplastic vulcanizate.
Figure 4:
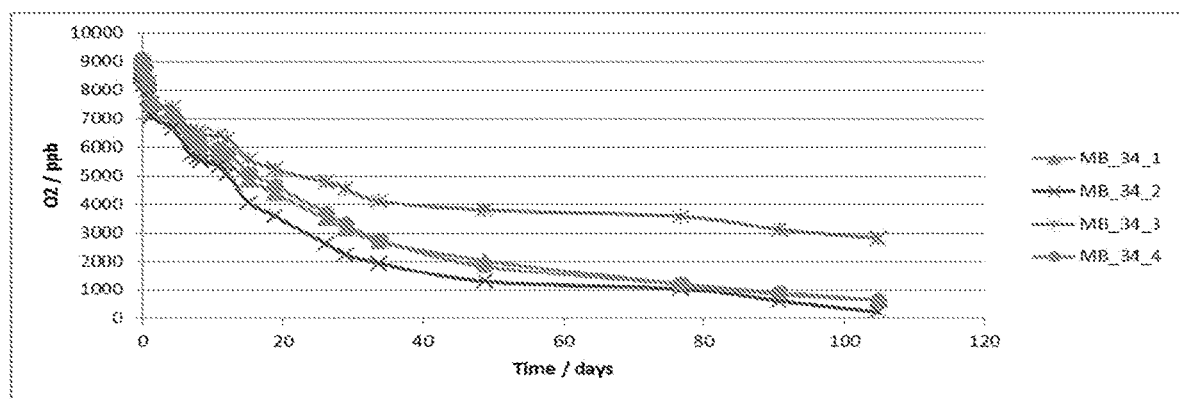
FIG. 4 is a graph depicting oxygen levels over time in a container that holds both oxygen-saturated water and a base resin material comprising a second thermoplastic vulcanizate.
Figure 6:
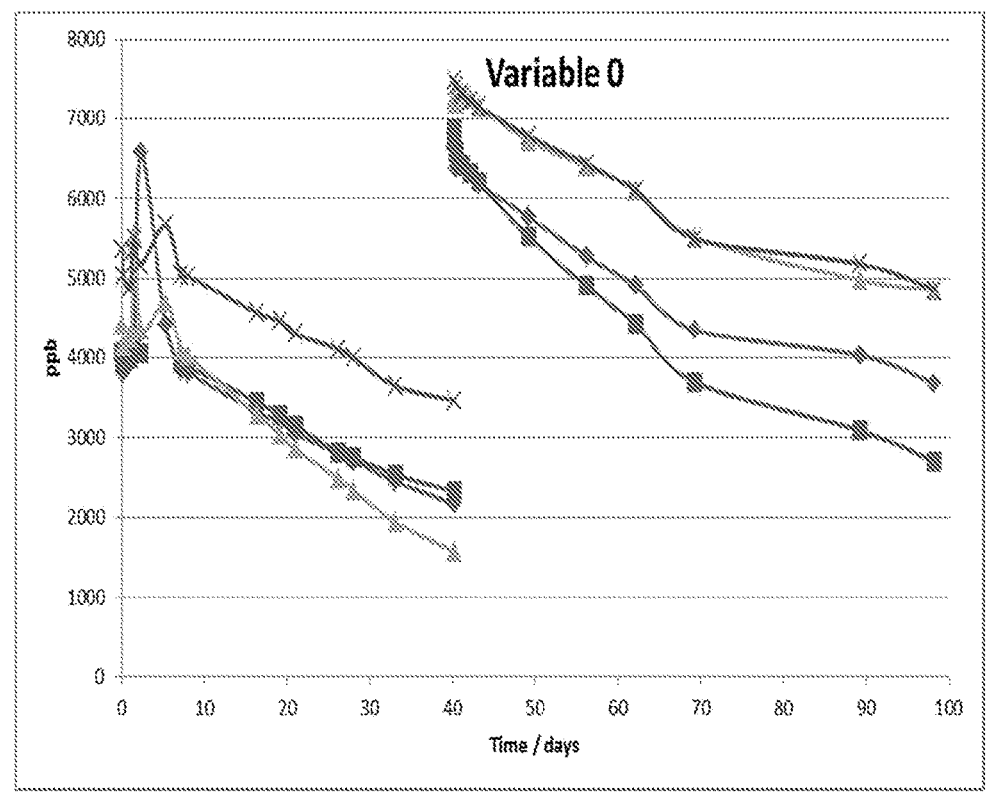
FIG. 6 is a graph depicting oxygen levels over time in a container that holds both oxygen-saturated water and a base resin material comprising a third thermoplastic vulcanizate.

FIGS. 2 and 4 depict oxygen levels over time in sealed glass flasks filled with oxygen-saturated water and with thermoplastic elastomer base resins (specifically, thermoplastic vulcanizates) inserted into the flasks, and FIG. 6 depicts oxygen levels over time in sealed glass flasks filled with demineralized tap water having an oxygen concentration of approximately 8000 ppm. and with thermoplastic elastomer base resins (specifically, thermoplastic vulcanizates) inserted into the flasks. FIG. 2 depicts the oxygen levels in a glass flask filled with water into which a sample of a first type of thermoplastic vulcanizate has been inserted, FIG. 4 depicts the oxygen levels in a glass flask filled with water into which a sample of a second type of thermoplastic vulcanizate has been inserted, and FIG. 6 depicts the oxygen levels in a glass flask filled with water into which a sample of a third type of thermoplastic vulcanizate has been inserted. While the oxygen levels measured in FIGS. 2, 4, and 6 decrease gradually over time, the thermoplastic elastomer base resins, on their own, do not scavenge oxygen quickly enough for the purposes of the present invention.

For the purposes of the present invention, the term "oxygen-scavenging" refers to a material that reacts with ambient oxygen, reducing the amount of oxygen in a volume of gas or liquid that comes into contact with the "oxygen-scavenging" material. For example, an oxygen-scavenging material located in the interior of a closed container will reduce the ambient levels of oxygen in that closed container over time as oxygen within the container is consumed via oxidation reactions with the oxygen-scavenging material.

In embodiments of the invention, an oxygen-scavenging material is an oxygen-scavenging polymer that comprises both a hydrophobic polymer and an oxygen scavenger. Hydrophobic polymers comprise relatively fewer polar functional groups than hydrophilic polymers, rendering these hydrophobic polymers insoluble in water. In some preferred embodiments, the hydrophobic polymer is a polyolefin such as polyethylene or polypropylene, a polyester such as polyamide or polyethylene terephthalate (PET), a thermoplastic elastomer such as thermoplastic vulcanizate, styrene isoprene butadiene, polymethylpentene, polybutene-1, polyisobutylene, ethylene propylene rubber, or ethylene propylene diene monomer rubber, or a blend of two or more such hydrophobic polymers. The hydrophobic polymer serves as a barrier to moisture and is relatively impermeable to water vapor at ambient temperatures.

In some preferred embodiments of the invention, the hydrophobic polymer is a thermoplastic vulcanizate, such as (for example) one of a group of soft, colorable, specialty thermoplastic vulcanizates (TPVs) in the thermoplastic elastomer (TPE) family. These thermoplastic vulcanizates can be used, for example, in non-fatty food contact applications.

In various embodiments of the invention, the oxygen scavenger may comprise particles of an oxygen-scavenging material dispersed throughout a matrix of the hydrophobic polymer. In various embodiments of the invention, the oxygen scavenger dispersed throughout the hydrophobic polymer matrix may be a water-activated oxygen scavenging material that is activated by humidity/water absorption. Such water-activated oxygen scavenging materials include sodium sulphite, sodium ascorbate, potassium sulphite, and potassium ascorbate. In some preferred embodiments of the invention, the oxygen-scavenging material dispersed throughout the hydrophobic polymer matrix is sodium sulphite.

In various embodiments of the invention, the oxygen-scavenging polymer material may comprise between about 5% and 20% oxygen scavenger, between about 10% and about 15% oxygen scavenger or between about 12% and about 13% oxygen scavenger. In some preferred embodiments of the invention, the oxygen-scavenging polymer comprises about 12% sodium sulphite.

As those of ordinary skill in the art will recognize, too little or too much oxygen scavenger, such as, for example, sodium sulphite, will reduce the oxygen-scavenging rate of the oxygen-scavenging polymer to less effective levels. Moreover, as those of ordinary skill in the art will also appreciate, excessive amounts of sulfites in a food or beverage can cause negative reactions in sulfite-sensitive individuals, and therefore the levels of sodium sulphite in the oxygen-scavenging polymer may be limited in some embodiments of the invention.

In some embodiments of the invention, the oxygen-scavenging material also comprises one or more hydrophilic polymers. Hydrophilic polymers comprise polar or charged functional groups, which give these polymers a greater affinity for water, and may render the hydrophilic polymer water-soluble. In some preferred embodiments of the invention, the hydrophilic polymer is dispersed, along with the oxygen scavenger, throughout the matrix of hydrophobic polymer. It is believed that the hydrophilic polymer, when dispersed throughout the hydrophobic matrix, conducts moisture to the oxygen scavenger dispersed throughout the hydrophobic matrix. This results in the oxygen scavenger reacting with the water vapor to scavenge oxygen and quickly reduce the oxygen levels of the surrounding environment.

In some preferred embodiments of the invention, the hydrophilic polymer comprises ethylene vinyl alcohol (EVOH), polyvinyl alcohol (PVOH), or a polyester such as polyamide. In these embodiments, the oxygen-scavenging polymer material may comprise between about 1% and about 6% hydrophilic polymer, or between about 2% and about 5% hydrophilic polymer. In some preferred embodiments, the oxygen-scavenging polymer material comprises about 3% EVOH and about 12% sodium sulphite. In other preferred embodiments, the oxygen-scavenging polymer material comprises about 4% EVOH and about 12% sodium sulphite.

In some exemplary embodiments of the present invention, the oxygen-scavenging polymer may comprise talc. In these embodiments, the talc may facilitate the adsorption of moisture into the oxygen-scavenging polymer. In some of these exemplary embodiments of the invention, the oxygen-scavenging polymer may comprise between about 1% and about 10% talc. In certain preferred embodiments, the oxygen-scavenging polymer may comprise between about 4% and about 6% talc.

In some embodiments of the present invention, various apparatuses comprising the oxygen-scavenging polymer can be manufactured and used. In some embodiments of the present invention, the apparatus may be a device used to store, transport, or dispense beer. In other embodiments of the present invention, however, the apparatus may be a device used to store, transport, or dispense other beverages, such as a cider, a wine, a malt-based beverage, a fermented beverage, a cider-based beverage, a spirit, a juice, a syrup, a carbonated or non-carbonated soft drink, a coffee, or a tea. Similarly, the apparatus may be a device used to store or transport foodstuffs, or ingredients for a food or a beverage, including solid or liquid ingredients such as hop concentrates, fruit concentrates, sweeteners, bittering additives, concentrated spices, foaming promoters, concentrated malt-based liquids, concentrated fermented liquids, concentrated beer, colorants, flavoring additives, and mixtures thereof. In some cases, the ingredients (for example, an alcoholic concentrated beer) may be alcoholic ingredients. Examples of suitable flavor additives include (but are not limited to) a spice flavor, a fruit flavor, a hop flavor, a malt flavor, a nut flavor, a smoke flavor, other suitable flavors (such as a coffee flavor or a chocolate flavor), and mixtures of such flavors.

For the purposes of the present invention, the term "beer" is defined as a beverage produced by the brewing and fermentation of a starch source in water using yeast. Suitable starch sources include, but are not limited to, grains such as barley, wheat, corn, rice, sorghum, and millet. Other starch sources, such as cassava, sugarcane, and potato, can also be used as a starch source to produce a beer. Similarly, various strains of yeast may be used to ferment a "beer," including but not limited to ale yeast strains ("top-fermenting" yeast) and lager yeast strains ("bottom-fermenting" yeast).

For the purposes of the present invention, the term "beer" includes but is not limited to a particular subset of beverages defined as a "beer" under a particular state's laws, regulations, or standards. For example, the German Reinheitsgebot states that a beverage having ingredients other than water, barley-malt, and hops cannot be considered a "beer"—but for the purposes of the present invention, the term "beer" has no such ingredient restrictions. Similarly, for the purposes of the present invention, the term "beer" does not import or imply a restriction on the alcoholic content of a beverage.

In some exemplary embodiments of the invention, the apparatus for storing, dispensing, or transporting beer is a closure for a beverage container (for example, a cap or tab), the closure comprising both a shell as well as sealing elements. The sealing elements are suitable for sealing the shell of the closure to a mouth of a container when the closure is fixed to the mouth of the container. In some preferred embodiments of these exemplary closures, the shell of the closure is comprised of the hydrophobic polymer, for example a polyolefin such as polyethylene or polypropylene, and the sealing elements are comprised of thermoplastic elastomer (such as a thermoplastic vulcanizate). In preferred embodiments of the invention, an oxygen scavenger, such as sodium sulfite, is dispersed throughout the sealing elements, the shell, or both.

In some other exemplary embodiments of the invention, the apparatus for storing, dispensing, or transporting beer may be any of a bottle, can, or other container or packaging for storing one or more servings of beer or other beverages; a pod, pack, capsule, cartridge, or other container for storing beer flavors, beer concentrate, or other beverages, beverage concentrates, ingredients, or concentrated ingredients; a liquid line, or a portion thereof, for transporting beer or other beverages through the liquid line; and a reservoir or similar container for holding one or more servings of beer or other beverages. In exemplary embodiments of the invention where the apparatus is a container, the capacity of the container may range from as little as 0.01 liters to as much as 20 liters.

In these exemplary embodiments of the invention, the container may comprise at least one wall, that at least one wall comprising the oxygen-scavenging polymer of the present invention. The container may comprise one or more beverages, concentrated beverages, beverage components, or concentrated beverage components, as described above. In some embodiments, the container is a sealed container containing a gas. In these embodiments, the gas may be a pressurized gas used to pressurize a beverage or concentrated beverage in the sealed container, including but not limited to one or more of carbon dioxide, nitrogen, nitrogen dioxide, and nitrous oxide. In these embodiments, the pressurized gas dissolves into the concentrated beverage. In some embodiments, the gas may be an inert gas.

In some embodiments of the invention, a beverage is produced by combining a liquid with a beverage or beverage component contained within the containers of the present invention. In certain exemplary embodiments of the invention, water is added to the concentrated beverage to produce a beverage suitable for consumption. In other embodiments, the water is carbonated water or beer. In other exemplary embodiments, the beverage produced by mixing the concentrated beverage with water is carbonated by dissolving (through sparging or equivalent processes known to those of skill in the art) additional carbon dioxide into the beverage. In exemplary embodiments of the invention, additional alcohol, flavors, colorants, or other ingredients may be added to the beverage as well.

In the exemplary apparatuses described above, the oxygen-scavenging polymer may have one or more beneficial effects. The oxygen-scavenging polymer absorbs moisture and water vapor and scavenges oxygen in the apparatuses, reducing the effects of oxidation reactions on the taste of the beer that is contained, transported, and dispensed from these apparatuses. The oxygen-scavenging polymer also aids in the prevention of microorganism growth, such as the growth of fungi, bacteria, and other undesirable organisms. And the oxygen-scavenging polymer helps promote a desirable amount of foam on the surface of the beer.

EXAMPLES

The following Examples describe exemplary embodiments of the oxygen-scavenging polymer of the present invention. These exemplary embodiments each comprise a sample of an oxygen-scavenging polymer cut from an injection-molded plate of the oxygen-scavenging polymer.

Example 1

Four glass flasks were filled with 60 cc of water that had been saturated with oxygen at ambient conditions (e.g. ambient pressure of about 960 millibars to about 970 millibars, and a temperature of about 23 degrees Celsius), and oxygen sensors were placed in the flasks to measure the oxygen levels within the flasks (in parts per billion).

Figure 3:
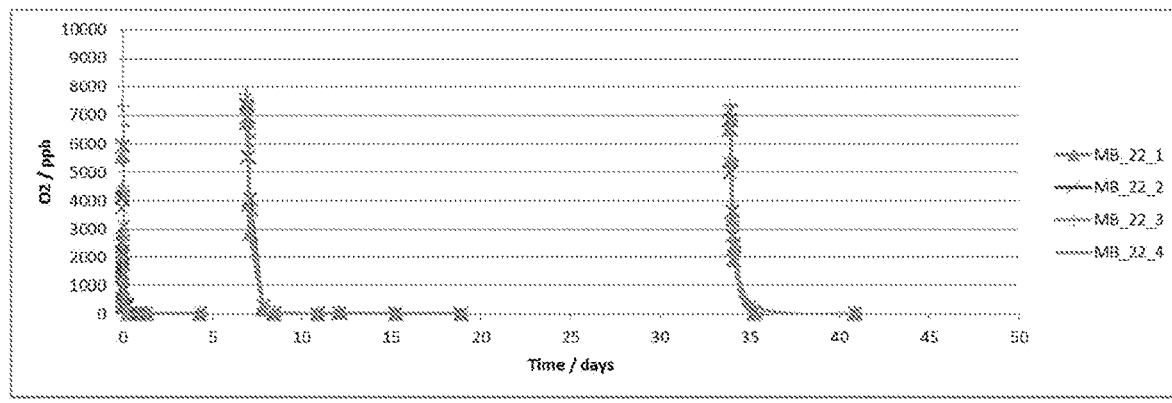
FIG. 3 is a graph depicting oxygen levels over time in a container that holds both oxygen-saturated water and an oxygen-scavenging material comprising the first thermoplastic vulcanizate, ethylene vinyl alcohol (EVOH), and sodium sulfite.

A sample of the first exemplary oxygen-scavenging polymer, weighing 3.5 grams and 2 mm thick, was placed in each of the four flasks, and then the flasks were sealed. Once the oxygen content in the flask reached near zero, the flasks were opened, the water emptied, and the flasks refilled with oxygen-saturated water and resealed. FIG. 3 illustrates the oxygen levels in these four glass flasks measured over time (in parts per billion). Once the oxygen in a flask was depleted, the measurements were repeated twice with new volumes of oxygen-saturated water.

The first exemplary embodiment of the oxygen-scavenging polymer, used in the experiment illustrated by FIG. 3, is comprised of the first type of thermoplastic vulcanizate used in the experiment depicted in FIG. 2, as well as 12% sodium sulphite and 3% ethylene vinyl alcohol (EVOH).

In comparison to the thermoplastic elastomer base resin (comprising the first type of thermoplastic vulcanizate) used in the experiment depicted in FIG. 2, the first exemplary embodiment of the oxygen-scavenging polymer absorbed oxygen at a much greater rate (by a factor of thousands) than the thermoplastic elastomer base resin when the oxygen-scavenging polymer was first placed in the flask. The material utilized in the experiment depicted in FIG. 2 had a normalized reaction constant of 0.34±0.15, whereas the first exemplary oxygen-scavenging polymer used in the experiment depicted in FIG. 3 had a normalized reaction constant of 6244±838 during the first trial. Even when the flasks were refilled with oxygen-saturated water, the normalized reaction constant of the first exemplary oxygen-scavenging polymer was hundreds of times that of the thermoplastic elastomer base resin depicted in FIG. 2.

Example 2

Four glass flasks were filled with 60 cc of water that had been saturated with oxygen at ambient conditions (e.g. ambient pressure of about 960 millibars to about 970 millibars, and a temperature of about 23 degrees Celsius), and oxygen sensors were placed in the flasks to measure the oxygen levels within the flasks (in parts per billion).

Figure 5A:
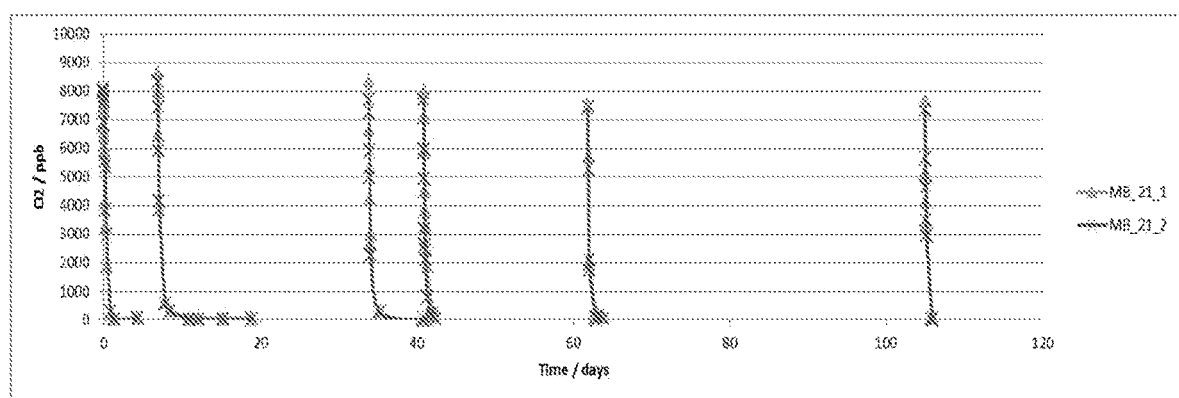
FIGS. 5A and 5B are graphs depicting oxygen levels over time in a container that holds both oxygen-saturated water and an oxygen-scavenging material comprising the second thermoplastic vulcanizate, ethylene vinyl alcohol (EVOH), and sodium sulfite.
Figure 5B:
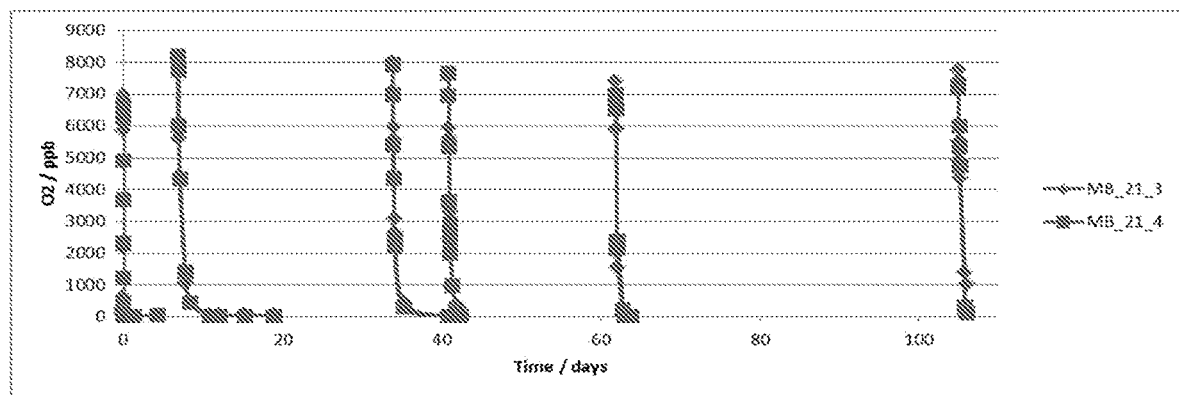

A sample of the second exemplary oxygen-scavenging polymer, weighing 3.5 grams and 2 mm thick, was placed in each of the four flasks, and then the flasks were sealed. Once the oxygen content in the flask reached near zero, the flasks were opened, the water emptied, and the flasks refilled with oxygen-saturated water and resealed. FIGS. 5A and 5B illustrates the oxygen levels in these four glass flasks measured over time (in parts per billion). Once the oxygen in a flask was depleted, the measurements were repeated six times with new volumes of oxygen-saturated water.

The second exemplary embodiment of the oxygen-scavenging polymer, used in the experiment illustrated by FIGS. 5A and 5B, is comprised of the second type of thermoplastic vulcanizate used in the experiment depicted in FIG. 4, as well as 12% sodium sulphite and 3% ethylene vinyl alcohol (EVOH).

In comparison to the thermoplastic elastomer base resin (comprising the second type of thermoplastic vulcanizate) used in the experiment depicted in FIG. 4, the second exemplary embodiment of the oxygen-scavenging polymer absorbed oxygen at a much greater rate (by a factor of thousands) than the thermoplastic elastomer base resin when the oxygen-scavenging polymer was first placed in the flask. The material utilized in the experiment depicted in FIG. 4 had a normalized reaction constant of 0.35±0.21, whereas the second exemplary oxygen-scavenging polymer used in the experiment depicted in FIGS. 5A and 5B had a normalized reaction constant of 18420±8750 during the first trial. Even when the flasks were refilled with oxygen-saturated water, the normalized reaction constant of the second exemplary oxygen-scavenging polymer was still hundreds of times that of the thermoplastic elastomer base resin depicted in FIG. 4.

Example 3

Figure 7:
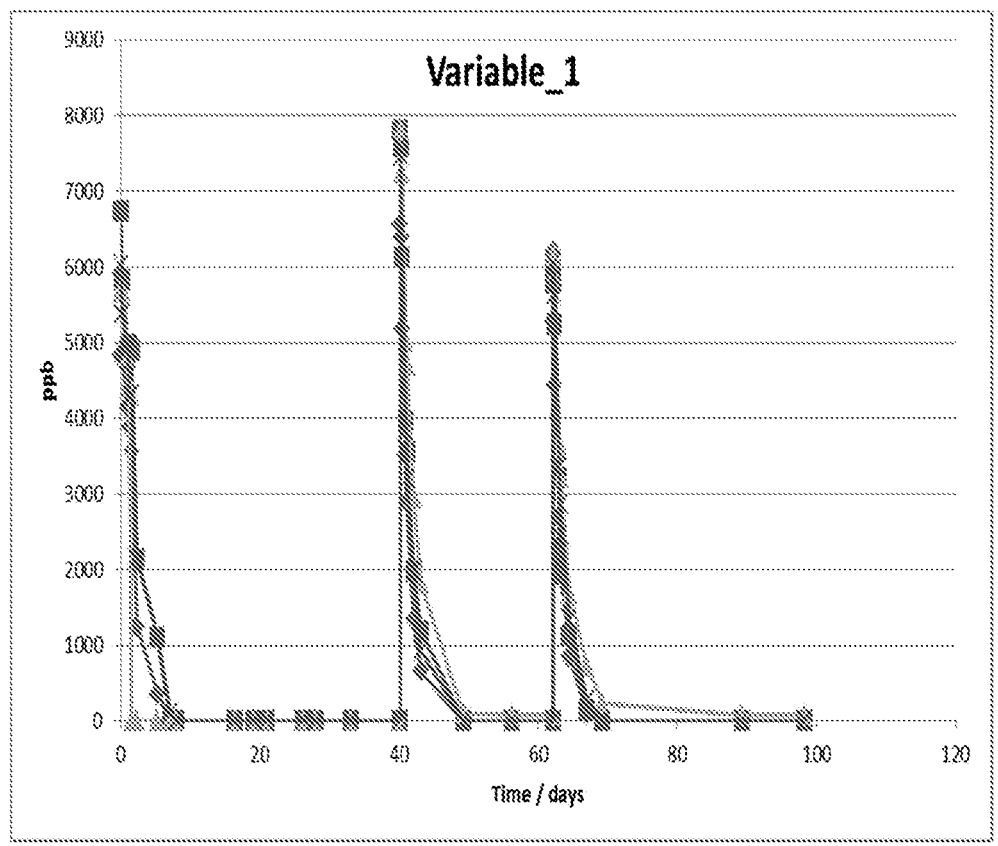
FIG. 7 is a graph depicting oxygen levels over time in a container that holds both oxygen-saturated water and an oxygen-scavenging material comprising the third thermoplastic vulcanizate, talc, and sodium sulfite.
Figure 8:
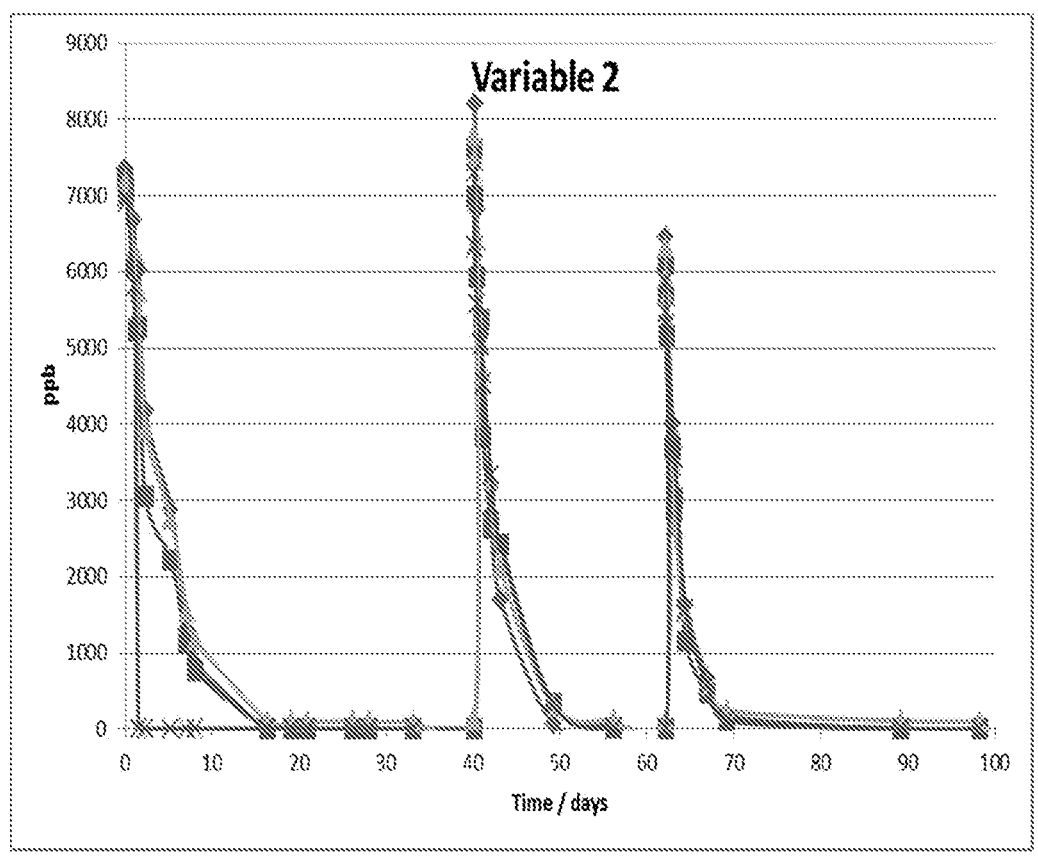
FIG. 8 is a graph depicting oxygen levels over time in a container that holds both oxygen-saturated water and an oxygen-scavenging material comprising the third thermoplastic vulcanizate, talc, ethylene vinyl alcohol (EVOH), and sodium sulfite.

FIGS. 7 and 8 each illustrate the oxygen levels over time in two separate groups of four glass flasks filled with demineralized tap water (having an oxygen content of 8000 ppm). For the experiment depicted in FIG. 7, a sample of a third exemplary embodiment of the oxygen-scavenging polymer of the present invention, weighing 0.66 grams and 2 mm thick, was placed in each of the four glass flasks of the first group of four flasks, the flasks sealed, and the oxygen levels in the flasks measured over time (in parts per billion). For the experiment depicted in FIG. 8, a sample of a third exemplary embodiment of the oxygen-scavenging polymer of the present invention, weighing 0.66 grams and 2 mm thick, was placed in each of the four glass flasks of the first group of four flasks, the flasks sealed, and the oxygen levels in the flasks measured over time (in parts per billion). In each experiment, once the oxygen in a flask was depleted, the measurements were repeated twice with new volumes of oxygen-saturated water.

The third exemplary embodiment of the oxygen-scavenging polymer, used in the experiment illustrated by FIG. 7, is comprised of the third type of thermoplastic vulcanizate used in the experiment depicted in FIG. 6, as well as talc and 12% sodium sulphite. The fourth exemplary embodiment of the oxygen-scavenging polymer, used in the experiment illustrated by FIG. 8, is comprised of the third type of thermoplastic vulcanizate used in the experiment depicted in FIG. 6, as well as talc, 12% sodium sulphite, and 4% ethylene vinyl alcohol (EVOH).

In comparison to the thermoplastic elastomer base resin (comprising the third type of thermoplastic vulcanizate) used in the experiment depicted in FIG. 6, the third and fourth exemplary oxygen-scavenging polymers absorbed oxygen at a much greater rate than the thermoplastic elastomer base resin when those exemplary oxygen-scavenging polymers were first placed in the flask. And even when the flasks were refilled with demineralized tap water, the third and fourth exemplary oxygen-scavenging polymers of FIGS. 7 and 8 reacted at a much faster rate than the thermoplastic elastomer base resin depicted in FIG. 6.

Embodiments and examples of the present invention have been described for the purpose of illustration. Persons skilled in the art will recognize from this description that the described embodiments and examples are not limiting, and may be practiced with modifications and alterations limited only by the spirit and scope of the appended claims which are intended to cover such modifications and alterations, so as to afford broad protection to the various embodiments of the invention and their equivalents.

What is claimed is:

1. An oxygen-scavenging polymer composition for packing and storing foods and beverages, the oxygen-scavenging polymer composition comprising:
    a hydrophobic polymer comprising a thermoplastic vulcanizate;
    a water activatable oxygen scavenger consisting of 12 weight % sodium sulphite;
    between 2 weight % and 5 weight % of a hydrophilic polymer;
    between 1 weight % and 10 weight % of a talc; and wherein the hydrophilic polymer and particles of the oxygen scavenger are each dispersed throughout a matrix of the hydrophobic polymer.

2. The oxygen-scavenging polymer composition of claim 1, wherein the hydrophilic polymer is selected from the group consisting of ethylene vinyl alcohol polymer, polyvinyl alcohol, and polyesters.

3. An apparatus containing an oxygen-scavenging polymer composition for packing and storing foods and beverages comprising the oxygen-scavenging polymer composition of claim 1.

4. The apparatus of claim 3, wherein the apparatus is a closure for a beverage container, the closure comprising a shell and sealing elements.

5. A container comprising:
   (a) at least one wall, the at least one wall comprising the oxygen-scavenging polymer composition of claim 1; and
   (b) at least one beverage or beverage component.

6. The container of claim 5, wherein the at least one beverage or beverage component is selected from the group consisting of a beverage, a beverage concentrate, a beverage component, and a concentrated beverage component.

7. The container of claim 6, wherein a volume of the beverage concentrate comprises between about 2 times and about 6 times the sugar content and alcohol content of an equal volume of a beverage from which the beverage concentrate is derived.

8. A method for preparing a beverage comprising the steps of:
   (a) providing the apparatus of claim 5, wherein the apparatus comprises a first container comprising at least one wall, and at least one beverage component, and
   (b) diluting the beverage component with a liquid to prepare a beverage.

* * * * *